United States Patent
Lei et al.

(10) Patent No.: US 8,588,544 B2
(45) Date of Patent: Nov. 19, 2013

(54) METHOD AND SYSTEM FOR REDUCING RINGING ARTIFACTS OF IMAGE DECONVOLUTION

(75) Inventors: Zhichun Lei, Stuttgart (DE); Klaus Zimmermann, Deizisau (DE)

(73) Assignee: Sony Corporation, Tokyo (JP)

( * ) Notice: Subject to any disclaimer, the term of this patent is extended or adjusted under 35 U.S.C. 154(b) by 326 days.

(21) Appl. No.: 12/893,677

(22) Filed: Sep. 29, 2010

(65) Prior Publication Data

US 2011/0085743 A1   Apr. 14, 2011

(30) Foreign Application Priority Data

Oct. 13, 2009   (EP) .................................. 09172911

(51) Int. Cl.
*G06K 9/40* (2006.01)

(52) U.S. Cl.
USPC .......................................... 382/266; 382/275

(58) Field of Classification Search
None
See application file for complete search history.

(56) References Cited

U.S. PATENT DOCUMENTS

| 2006/0055826 | A1 | 3/2006 | Zimmermann et al. |
| 2007/0189610 | A1 | 8/2007 | Lei et al. |
| 2007/0189630 | A1* | 8/2007 | Lei ................................ 382/254 |
| 2008/0129875 | A1 | 6/2008 | Lei et al. |
| 2008/0240607 | A1* | 10/2008 | Sun et al. ..................... 382/275 |
| 2009/0123079 | A1 | 5/2009 | Kirenko |
| 2009/0148062 | A1 | 6/2009 | Gabso et al. |
| 2009/0226108 | A1* | 9/2009 | Kent ............................. 382/255 |
| 2010/0040290 | A1 | 2/2010 | Lei |
| 2010/0074552 | A1* | 3/2010 | Sun et al. ..................... 382/264 |
| 2010/0091194 | A1 | 4/2010 | Lei et al. |
| 2010/0092086 | A1 | 4/2010 | Lei et al. |
| 2010/0158122 | A1 | 6/2010 | Fernandez et al. |
| 2010/0259607 | A1* | 10/2010 | Kennedy et al. ............. 348/113 |
| 2010/0266218 | A1* | 10/2010 | Tezaur ......................... 382/260 |
| 2011/0292216 | A1* | 12/2011 | Fergus et al. ................ 348/164 |

OTHER PUBLICATIONS

Joshi et al., "PSF Estimation using Sharp Edge Prediction," IEEE Conference on Computer Vision and Pattern Recognition, Anchorage, Alaska, Jun. 2008.*
U.S. Appl. No. 12/838,853, filed Jul. 19, 2010, Siddiqui, et al.
Kah Bin Lim, et al. "Ringing Reduction of Image Restoration." ICSP'02 Proceedings. IEEE. 2002. pp. 1757-1761.
Kazuhiro Fujita, et al. "An Edge-Adaptive Iterative Method for Image Restoration." Singapore ICCS/ISITA '92. IEEE. 1992. pp. 361-365.
Anat Levin, et al. "Deconvolution using natural image priors." Massuchusetts Institute of Techonology. 3 Pages. Available Online at http://groups.csail.mit.edu/graphics/CodedAperture/SparseDeconv-LevinEtA107.pdf.
Qi Shan, et al. "High-quality Motion Deblurring from a Single Image." ACM Transactions on Graphics. vol. 27, No. 3, Article 73. Aug. 2008. 10 pages.

* cited by examiner

*Primary Examiner* — Barry Drennan
*Assistant Examiner* — Andrew Moyer
(74) *Attorney, Agent, or Firm* — Oblon, Spivak, McClelland, Maier & Neustadt, L.L.P.

(57) ABSTRACT

The present invention relates to a method for reducing ringing artifacts of image deconvolution. A deconvolution is applied to the original blurred image and edges are detected within the deconvolved image. Then edge tapering on the original blurred image is performed based on the detected edges.
The present invention further relates to a system and a computer program product for reducing ringing artifacts of image deconvolution.

17 Claims, 3 Drawing Sheets

METHOD AND SYSTEM FOR REDUCING RINGING ARTIFACTS OF IMAGE DECONVOLUTION

FIELD OF INVENTION

The present invention relates to a method for reducing ringing artifacts in image data, to a computer program product for performing the steps of the method, to a system for reducing ringing artifacts in image data and to an imaging device comprising a system for ringing artifacts reduction. Specifically, the present invention relates to ringing artifact reduction of image deconvolution.

BACKGROUND OF THE INVENTION

When an image is taken it can be blurred due to for example handshake or the like. If the point spread function (PSF) is known, a deconvolution method can be applied to the blurred image to restore the original image from the blurry one. However, with most image deconvolutions ringing artifacts occur as a side effect, in particular if the point spread function in the frequency domain has nulls.

Different approaches have been carried out to reduce ringing artifacts of image deconvolution. One approach proposes image deconvolution using natural image priors, i. e. the sparsity of image gradients. Besides the sparsity prior another approach suggests a local image prior, i. e. the local image variants. By means of two image priors the ringing artifact can be avoided in flat areas.

However, according to prior art there are methods that work well for some types of pictures, but fail for other kinds of pictures. For example there are methods which provide a good result in flat areas but encounter problems with texture areas in particular in regions where texture and strong image structure co-exist.

SUMMARY OF INVENTION

It is therefore an object of the present invention to reduce the disadvantages of the prior art. Specifically, it is an object of the present invention to provide a method and system for an improved ringing artifact reduction of image deconvolution.

According to an aspect of the present invention there is provided a method for reducing ringing artifacts of image deconvolution, comprising the steps of
applying a deconvolution to the original blurred image,
detecting edges within the deconvolved image and
performing edge tapering on the original blurred image based on the detected edges.

According to a further aspect of the present invention there is provided a system for reducing ringing artifacts of image deconvolution, comprising
a deconvolution unit that applies a deconvolution to the original blurred image,
an edge detector that detects edges within the deconvolved image and
an edge tapering unit that performs edge tapering on the original blurred image based on the detected edges.

According to still a further aspect of the present invention there is provided a device, preferably a still camera, a video camera or a display, comprising such a system.

According to still a further aspect of the present invention there is provided a system for reducing ringing artifacts of image deconvolution, comprising
means for applying a deconvolution to the original blurred image,
means for detecting edges within the deconvolved image and
means for performing edge tapering on the original blurred image based on the detected edges.

According to still a further aspect of the present invention there is provided a computer program product stored on a computer readable non-transitory medium which causes a computer to perform the steps of
applying a deconvolution to the original blurred image,
detecting edges within the deconvolved image and
performing edge tapering on the original blurred image based on the detected edges Finally, according to still a further aspect of the present invention there is provided a computer readable non-transitory storage medium comprising such a computer program product.

Advantageous features and embodiments are the subject-matter of the dependent claims. Preferred embodiments of the invention are defined in the dependent claims. It shall be understood that the claimed systems, the claimed device, the claimed computer program product and the claimed computer readable storage medium have similar and/or identical preferred embodiments as the claimed method and as defined in the dependent claims.

BRIEF DESCRIPTION OF DRAWINGS

The present invention will now be explained in more detail in the following description of preferred embodiments in relation to the enclosed drawings in which.

DESCRIPTION OF PREFERRED EMBODIMENTS

As already explained after image deconvolution there can arise ringing artifacts. The present invention proposes to use an edge tapering method to suppress ringing artifacts of image deconvolution. However, for using the edge tapering method the edges have to be detected reliably. It is not possible to reliably detect edges from blurry images because blur operates like a low-pass filter and edges are flattened. According to the present invention it is therefore proposed that image edges are detected from the deblurred image. Although the deblurred image usually has ringing artifacts, their amplitude is smaller than that of the strong image edges. Therefore, according to the present invention ringing artifacts are prevented from affecting the edge tapering by selecting a corresponding large threshold value for the edge detection. In this way, the ringing artifact of the image deconvolution can be suppressed.

To make it more clear the present invention proposes to apply a deconvolution to the original blurred image, to detect edges within the deconvolved image and to perform an edge tapering within the original image using the edges detected from the deconvolved image.

Figure 1:
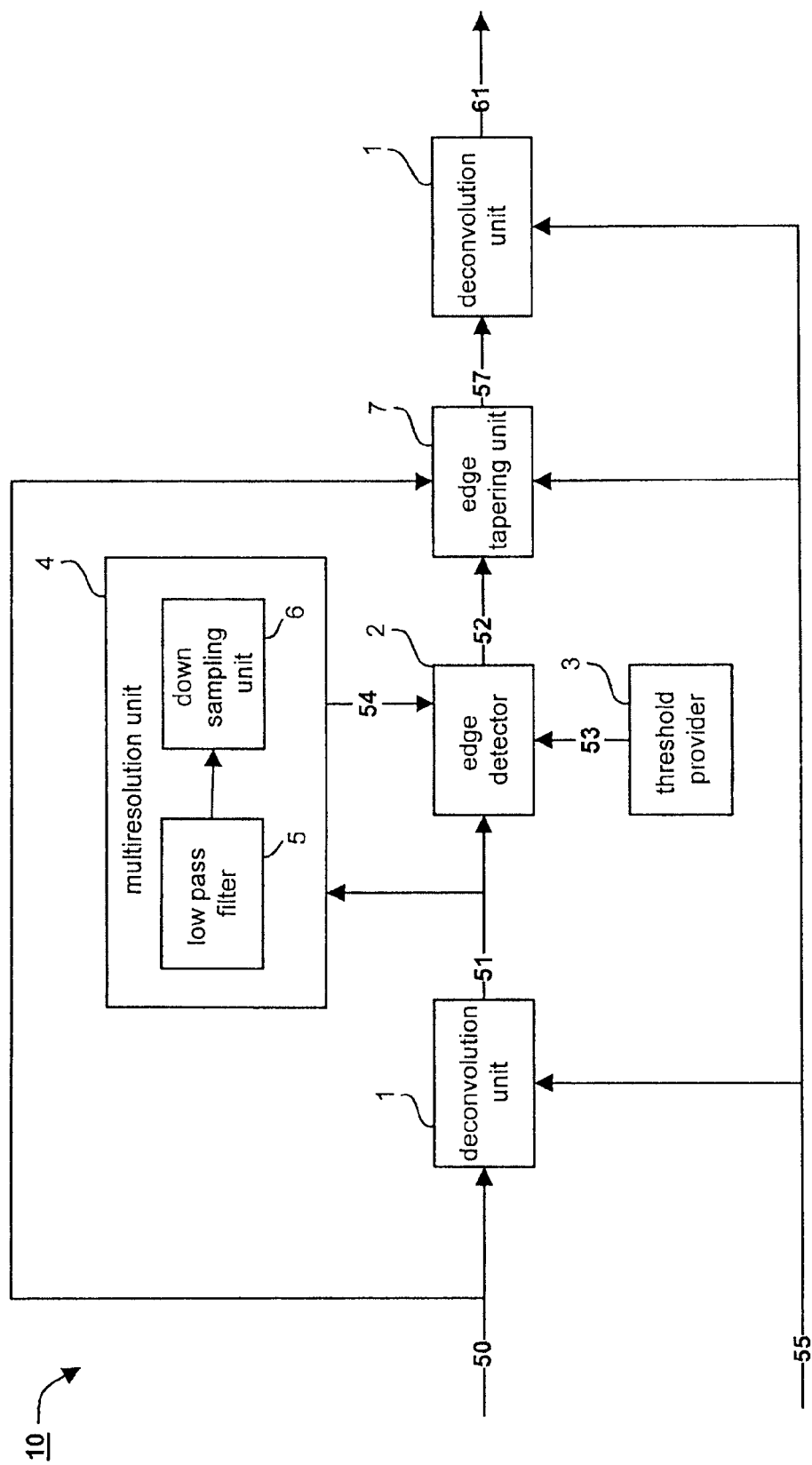
FIG. 1 shows a schematic block diagram of a ringing artifact reduction system according to a preferred embodiment of the present invention.

FIG. 1 shows a first embodiment of a system 10 for reducing ringing artifacts according to the present invention.

The original blurred image 50 as well as the point spread function (PSF) 55 are submitted to a deconvolution unit 1.

The deconvolution unit 1 is adapted to carry out a deconvolution on the original blurred image 50 or any other submitted image using the point spread function 55. As deconvolution any known or future deconvolution method can be used. The deconvolution can be iterative or non-iterative. Examples for the used deconvolution are the Van Cittert deconvolution, the Wiener deconvolution, the Richardson-Lucy deconvolution or any other known or future deconvolution method.

The deconvolved image 51 is then submitted to an edge detector 2. Further comprised in the system 10 is a threshold provider 3 which provides a threshold value 53 to the edge detector 2.

The edge detector 2 is adapted to use any known or future method of detecting edges using the threshold value 53 received by the threshold provider 3. Specifically, the edge detector 2 can calculate the differences between adjacent pixels and if the differences lie above the threshold value 53 then an edge is determined to be present between the two pixels.

In a preferred embodiment the threshold provider 3 provides always the same, i. e. a constant threshold value 53 to the edge detector 2. In the simplest form the threshold provider 3 can thus be simply a storage storing the threshold value 53.

The edge detector 2 will then output edge information 52 obtained from the deconvolved image 51, i.e. from the deblurred image, to the edge tapering unit 7.

Also the point spread function 55 and the original blurred image 50 will be submitted to the edge tapering unit 7.

The edge tapering unit 7 will use the information of the detected edges 52 submitted from the edge detector 2 to taper, i. e. attenuate edges within the original blurred image 50.

In the context of the present invention the expression "edge tapering" means edge strength attenuation. All the pixels within the size or the multiple size of the point spread function 55 around the detected edges according to the edge information 52 will be attenuated by a defined positive weighting factor w being for example smaller than 1, i.e. $0<w<1$. Edge tapering thus can also be described as edge attenuation.

The edge tapered image 57 is then submitted to the deconvolution unit 1, which carries out a deconvolution.

Hereby this deconvolution unit 1 preferably corresponds to the deconvolution unit 1 to which also the original blurred image 50 is submitted. So preferably there is provided only one single deconvolution unit 1 within the system 10, however for a matter of completeness and a better understanding the deconvolution unit 1 is shown twice in the FIG. 1.

The deconvolution unit 1 on the edge tapered image 57 using the point spread function 55 carries out a deconvolution and then outputs the ringing reduced image 61.

To make it clear again, according to the present invention the edge tapering is performed on the original blurred image 50. However, since for the edge tapering the edges have to be detected, the edge detection itself is carried out on a deconvolved and thus deblurred image.

Optionally, as shown in FIG. 1 a multi-resolution unit 4 can additionally be provided. With the proposed multi-resolution unit 4 the problem with the detection of middle or weak edges can be overcome.

Ringing artifacts can also be observed even if they are caused by middle or weak edges if the background is uniform. However, middle or weak edges cannot be detected using a large threshold value 53. To overcome this problem, it is proposed to detect edges in different resolution levels, using the multi-resolution unit 4.

The multi-resolution unit 4 for this purpose comprises a low-pass filter 5 and a down sampling unit 6. The deconvolved image 51 therefore is submitted to the multi-resolution unit where it is low-pass filtered by the low-pass filter 5 and then down-sampled by the down-sampling unit 6. The corresponding image having a different resolution 54 is then again submitted to the edge detector 2. By providing an image having a different resolution to the edge detector 2, the edge detector 2 can always use the same threshold value 53 provided by the threshold provider 3 but is able to detect even middle or weak edges.

It is of course possible to repeat the processing of the multi-resolution unit 4 several times in order to achieve different images having different resolutions which in turn allow to detect edges of different strength.

Thus, by means of the multi-resolution processing, middle or even weak edges can be detected, although the selected threshold value 53 is high. In the context of multi-resolution reference is made to document U.S. 2007/0189610 A1, the entire contents of which are incorporated herein by reference.

Figure 2:
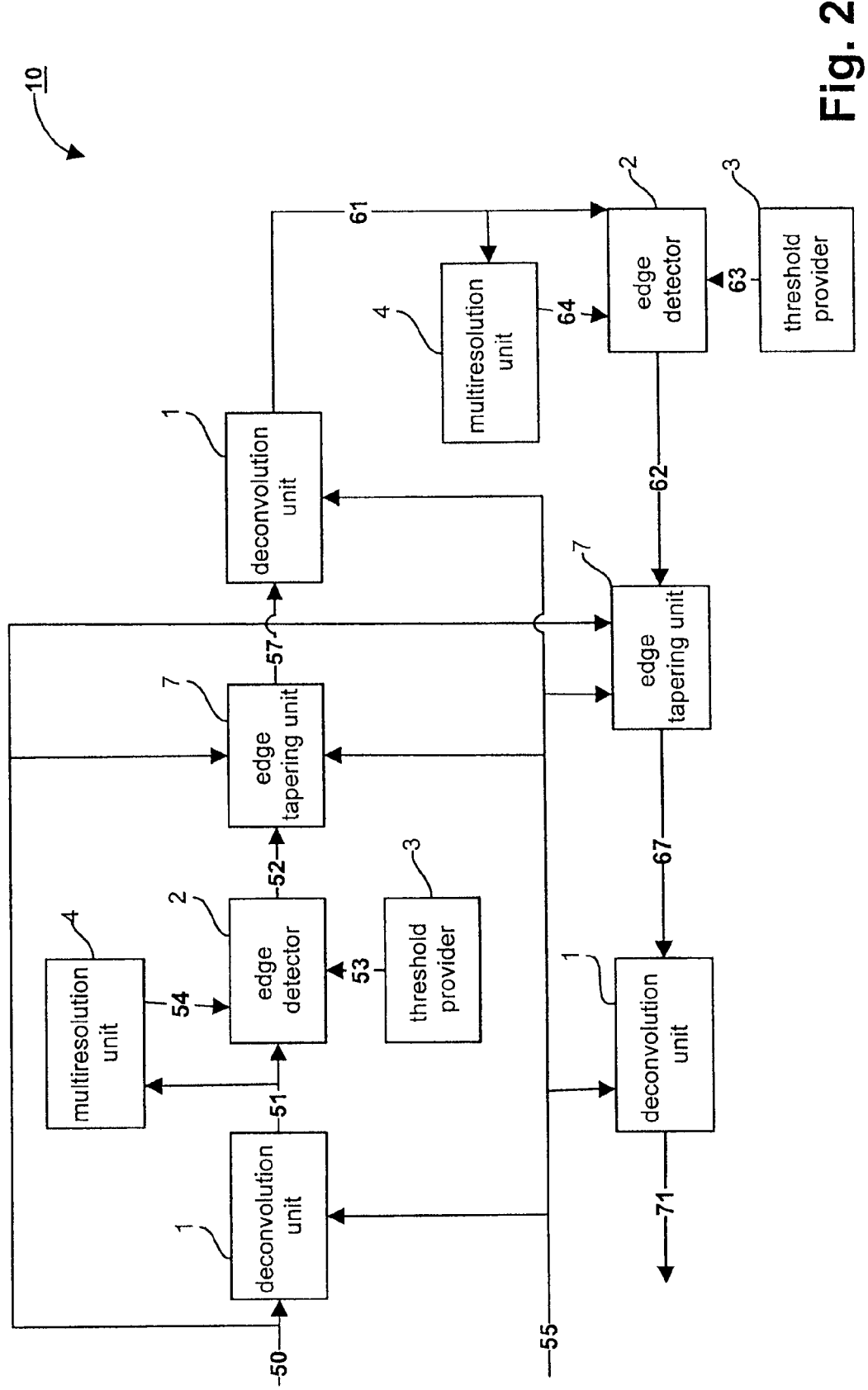
FIG. 2 shows a schematic block diagram of a ringing artifact reduction system according to a second embodiment of the present invention.

FIG. 2 shows a second embodiment of a system for reducing ringing artifacts 10 according to the present invention.

It is again to be noted that even although components having the same reference numeral are shown several times in FIG. 2 for the sake of clarity, in a preferred embodiment these components are not separate components but they are implemented into one single component and only for the sake of clarity are shown as separate component in the figure.

The components and processes starting from the reception of the original blurred image 50 until the output of a ringing-reduced image 61 are identical to the components and processes as shown in and explained with reference to FIG. 1.

In the second embodiment according to the present invention a cascade of deconvolutions is provided, whereby the deconvolutions can be the same or different and can be either iterative or non-iterative.

In this second embodiment the ringing-reduced image 61 is used to detect edges in order to avoid false edge detection from ringing artifacts. For this purpose the ringing-reduced image 61 is submitted to the edge detector 2. The edge detector 2 again receives the threshold value 63 from the threshold provider 3, whereby the threshold value 63 in this second cascade may differ from the threshold value 53 in the first cascade. The edge detector 2 then performs edge detection on the ringing-reduced image 61 and outputs the edge information 62 to the edge tapering unit 7. The edge tapering unit 7 in turn receives the original blurred image 50 and the point spread function and carries out an edge tapering on the original blurred image 50 using the edge information 62 which were obtained from the ringing reduced image 61.

Also in the second embodiment optionally and additionally the multi-resolution unit 4 can be provided which allows to provide images having different resolutions 64 to the edge detector 2.

The edge tapering unit 7 then outputs the edge tapered image 67 to the deconvolution unit 1 which then carries out a deconvolution based on the received point spread function 55 and finally outputs a ringing-suppressed image.

To make it clear the edge tapering unit 7 always carries out the edge tapering on the original blurred image 50 using the point spread function 55.

However, according to the present invention there are provided different possibilities of obtaining the edge information 52, 62. In the first embodiment the edge information is obtained either alone from the deconvolved image 51 or in addition to the deconvolved image 51 from one or more images having a different resolution. In the second embodiment the edge information 62 is obtained from the ringing-reduced image, where already an edge tapering has been performed. Also in the second embodiment additionally the multi-resolution can be provided.

Of course there can be provided even further cascades of deconvolution and the present invention is not limited to the number of deconvolutions as explained with reference to FIG. 2.

Figure 3:
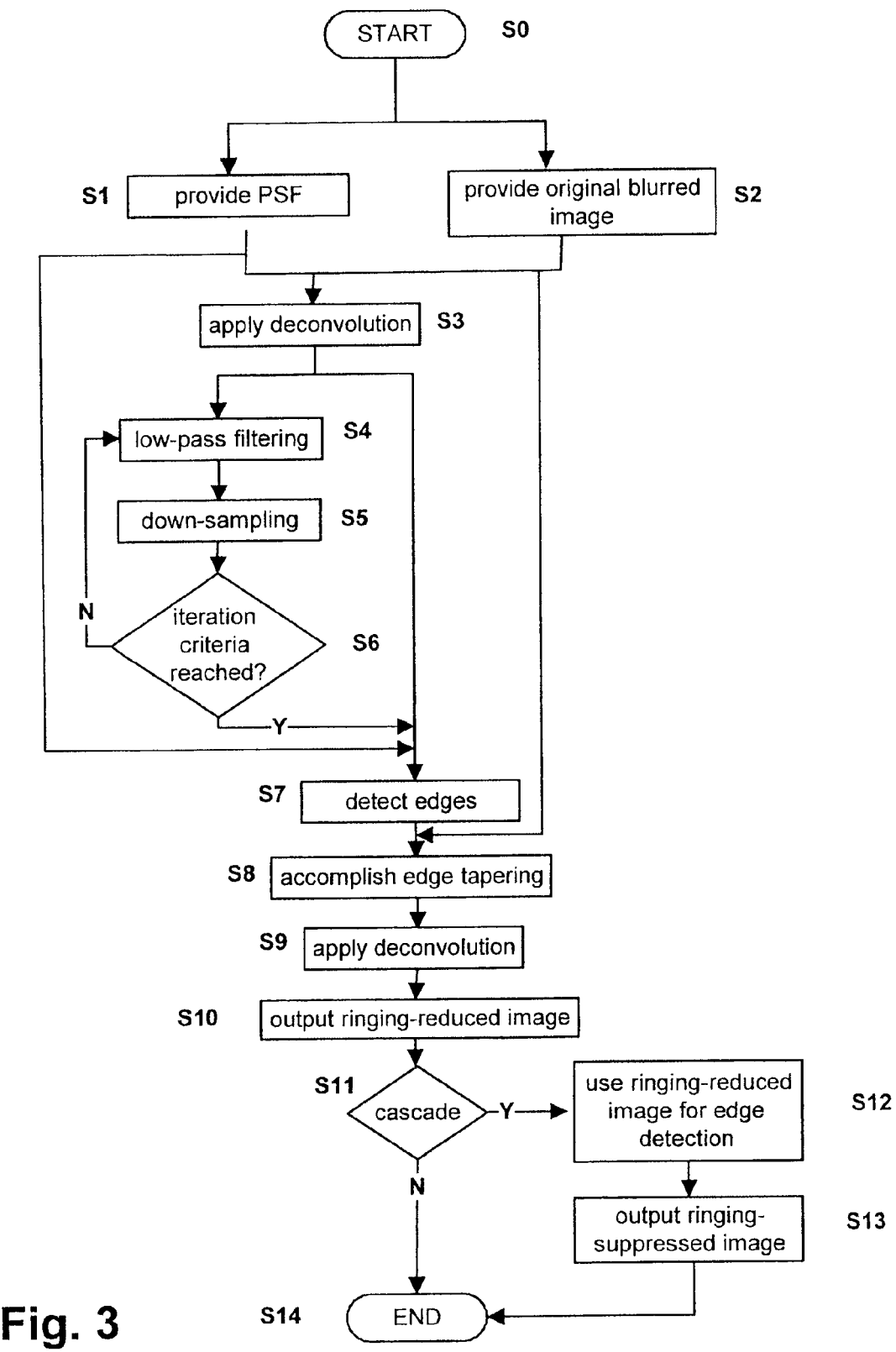
FIG. 3 shows a flow chart showing the process steps of the method according to the present invention.

The method of the present invention will now again be explained in more detail with respect to the flowchart shown in FIG. 3.

The process starts in step S0. In step S1 the point spread function PSF 55 is provided and in step S2 the original blurred image 50 is provided.

The point spread function and the original blurred image are then used to apply a deconvolution to the original blurred image in step S3. In case that a multi-resolution is provided, then the result of step S3, i. e. the deconvolved image 51 is low-pass filtered in step S4 and down-sampled in step S5. In step S6 it is checked whether the iteration criteria is reached. If this is not the case then again a low-pass filtering step S4 and a down-sampling step S5 is accomplished in order to achieve images having different resolutions.

Otherwise, if the iteration criteria are reached, then the corresponding one or more images having different resolutions undergo an edge detection in step S7. For this purpose the point spread function is also provided to the edge detector.

In case that no multi-resolution is provided, the deconvolved image 51 is directly submitted to the edge detector 2 which in step S7 performs an edge detection.

The original blurred image is provided to the edge tapering unit 7 which then in step S8 performs edge tapering on the original blurred image 50 based on the edge information 52 submitted by the edge detector 2.

In the next step S9 a deconvolution is applied to the edge tapered image 57. In step S10 a ringing-reduced image is output.

In step S11 it is checked whether a cascade of deconvolutions is provided. If this is not the case then the process ends in step S14.

Otherwise, the ringing-reduced image in step S12 is used for edge detection as previously described and after the corresponding processing in step S13 a ringing-suppressed image is output. The process then in any case ends in step S14.

The present method and system can be implemented in any device allowing to process and optionally display still or moving images, e.g. a still camera, a video camera, a TV, a PC or the like.

The present system, method and computer program product can specifically be used when displaying images in non-stroboscopic display devices, in particular Liquid Crystal Display Panels (LCDs), Thin Film Transistor Displays (TFTs), Color Sequential Displays, Plasma Display Panels (PDPs), Digital Micro Mirror Devices or Organic Light Emitting Diode (OLED) displays.

The above description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

With the present invention thus ringing artifacts of image deconvolution are strongly reduced by means of tapering edges that are detected from deblurred images and/or using a multi-resolution method and tapering edges that are detected from ringing-reduced image and/or using a multi-resolution processing method.

The invention claimed is:

1. A method for reducing ringing artifacts of image deconvolution, comprising:
    applying a first deconvolution to an original blurred image to obtain a deconvolved image,
    detecting edges within the deconvolved image,
    performing edge tapering on the original blurred image, including a strength attenuation of edges within the original blurred image, based on the detected edges of the deconvolved image to obtain an edge-tapered image,
    applying a second deconvolution to the edge-tapered image to obtain a ringing-reduced image, the ringing-reduced image having ringing artifacts,
    detecting edges within the ringing-reduced image having the ringing artifacts,
    repeating said edge tapering on the original blurred image based on the edges detected within the ringing-reduced image having the ringing artifacts, and
    applying a third deconvolution to the edge-tapered result of said repeating said edge tapering to obtain a ring-suppressed image having no ringing artifacts.

2. The method according to claim 1, further comprising:
    low pass filtering the deconvolved image,
    downsampling the filtered image, and
    using the downsampled filtered image for said edge detection.

3. The method according to claim 2, further comprising repeating said low pass filtering and downsampling at least once to obtain one or more downsampled filtered images with different resolutions for said edge detection.

4. The method according to claim 1, 2 or 3, wherein said detecting edges includes:
    calculating a pixel difference between adjacent pixels, and
    determining that an edge is present if the pixel difference exceeds a predefined threshold value.

5. The method according to claim 1, 2 or 3, wherein at least one of the first and second deconvolutions is iterative.

6. The method according to claim 1, 2 or 3, wherein said edge tapering includes attenuating pixels within a size or a multiple size of a point spread function around the detected edges.

7. The method according to claim 6, wherein the pixel attenuation is accomplished by multiplying the pixels with a positive fractional weighting factor.

8. A system for reducing ringing artifacts of image deconvolution, comprising:
    a deconvolution unit that applies a first deconvolution to an original blurred image to obtain a deconvolved image,
    an edge detector that detects edges within the deconvolved image, and
    an edge tapering unit that performs edge tapering on the original blurred image, including a strength attenuation of edges within the original blurred image, based on the detected edges of the deconvolved image to obtain an edge-tapered image, wherein the deconvolution unit is adapted to apply a second deconvolution to the edge-tapered image to obtain a ringing-reduced image, the ringing-reduced image having ringing artifacts, wherein the edge detector is adapted to detect edges within the ringing-reduced image having the ringing artifacts, the edge tapering on the original blurred image is repeated based on the edges detected within the ringing-reduced image having the ringing artifacts, and the deconvolution unit is adapted to perform a third deconvolution to the edge-tapered result of the repeated edge tapering to obtain a ring-suppressed image, the ring-suppressed image being without ringing artifacts.

9. The system according to claim 8, further comprising a multi-resolution unit including:

a low pass filter that low pass filters the deconvolved image, and a downsampling unit that downsamples the filtered image, wherein the edge detector is adapted to use the downsampled filtered image for the edge detection.

10. The system according to claim 9, wherein the multi-resolution unit is adapted to repeat the low pass filtering and downsampling at least once to obtain one or more downsampled filtered images with different resolutions for the edge detection.

11. The system according to claim 8, 9 or 10, wherein the edge detector is adapted to calculate a pixel difference between adjacent pixels, and determine that an edge is present if the pixel difference exceeds a predefined threshold value.

12. The system according to claim 8, 9 or 10, wherein at least one of the first and second deconvolutions is iterative.

13. The system according to claim 8, 9 or 10, wherein the edge tapering unit is adapted to attenuate pixels within a size or a multiple size of a point spread function around the detected edges.

14. The system according to claim 13, wherein the edge tapering unit is adapted to accomplish the pixel attenuation by multiplying the pixels with a positive fractional weighting factor.

15. A camera comprising the system according to any of claim 8, 9 or 10.

16. A system for reducing ringing artifacts of image deconvolution, comprising:

a processor including:

means for applying a first deconvolution to an original blurred image to obtain a deconvolved image, means for detecting edges within the deconvolved image, means for performing edge tapering on the original blurred image, including a strength attenuation of edges within the original blurred image, based on the detected edges of the deconvolved image to obtain an edge-tapered image, and means for applying a second deconvolution to the edge-tapered image to obtain a ringing-reduced image, the ringing-reduced image having ringing artifacts, wherein the means for detecting edges is adapted to detect edges within the ringing-reduced image having the ringing artifacts, the edge tapering on the original blurred image is repeated based on the edges detected within the ringing-reduced image having the ringing artifacts, and wherein the processor further includes means for applying a third deconvolution to the edge-tapered result of the repeated edge tapering to obtain a ring-suppressed image, the ring-suppressed image being without ringing artifacts.

17. A non-transitory computer-readable storage medium storing computer-readable instructions that, when executed by a computer, cause the computer to perform a method comprising:

applying a first deconvolution to an original blurred image to obtain a deconvolved image, detecting edges within the deconvolved image, performing edge tapering on the original blurred image, including a strength attenuation of edges within the original blurred image, based on the detected edges of the deconvolved image to obtain an edge-tapered image, applying a second deconvolution to the edge-tapered image to obtain a ringing-reduced image, the ringing-reduced image having ringing artifacts, detecting edges within the ringing-reduced image having the ringing artifacts, repeating said edge tapering on the original blurred image based on the edges detected within the ringing-reduced image having the ringing artifacts, and applying a third deconvolution to the edge-tapered result of said repeating said edge tapering to obtain a ring-suppressed image having no ringing artifacts.

* * * * *